United States Patent [19]
Farrell

[11] 3,937,610
[45] Feb. 10, 1976

[54] MIST COOLING OF INSIDE OF BLOWN PLASTIC ARTICLES

[75] Inventor: John J. Farrell, Green Brook, N.J.

[73] Assignee: Farrell Patent Company, Green Brook, N.J.

[22] Filed: Dec. 21, 1973

[21] Appl. No.: 427,334

[52] U.S. Cl.............................. 425/242 B; 425/387 B; 425/DIG. 208, 209
[51] Int. Cl.²................... B29D 23/02; B29D 23/03
[58] Field of Search.......... 425/DIG. 204, DIG. 209, 425/DIG. 208, 324 B, 242 B, 326 B, 387 B; 264/94, 97

[56] References Cited
UNITED STATES PATENTS

| | | |
|---|---|---|
| 3,127,458 | 3/1964 | Scott et al............. 425/DIG. 208 X |
| 3,305,890 | 2/1967 | Senior et al............ 425/DIG. 208 X |

Primary Examiner—Francis S. Husar
Assistant Examiner—Carl Rowold
Attorney, Agent, or Firm—Marvin Feldman

[57] ABSTRACT

This invention decreases the time required to cool a plastic article, in a blow molding cavity, by circulating a mist in the inside of the blown article. Globules of liquid in the mist contact with the inside surface of the blown article. Preferably this liquid evaporates and removes its latent heat evaporization from the plastic surface. This removes more heat per unit of time than is removed with a breeze of dry air flowing in the blown article. The article is cooled so that it is stiff enough to remove sooner from the blow mold. The mist can be followed by dry air to remove any lingering liquid from a blown container.

14 Claims, 5 Drawing Figures

U.S. Patent  Feb. 10, 1976  3,937,610
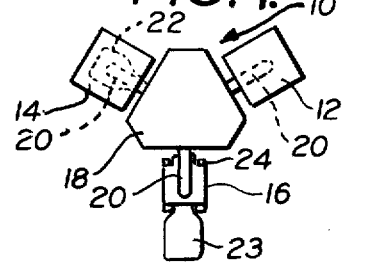
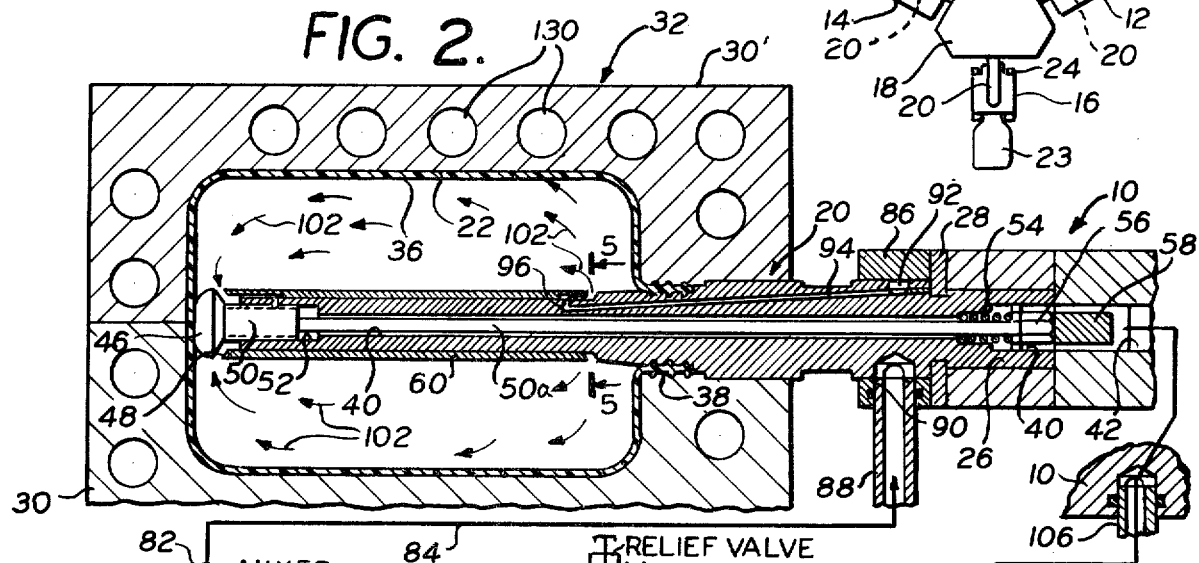
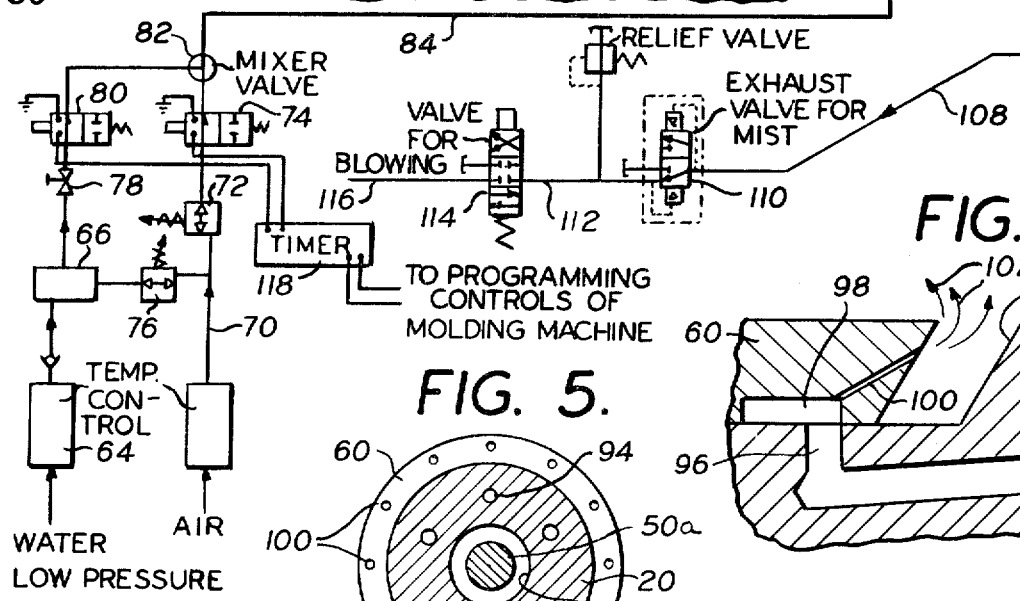
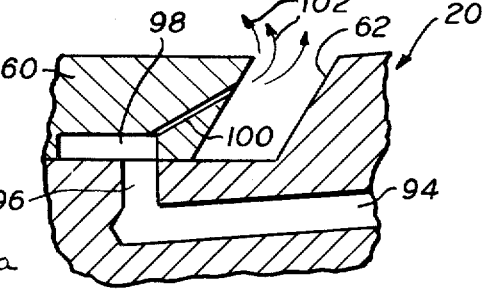
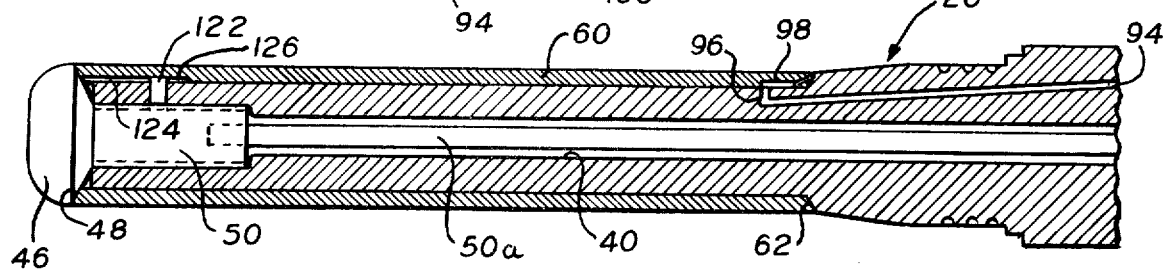

MIST COOLING OF INSIDE OF BLOWN PLASTIC ARTICLES

BACKGROUND AND SUMMARY OF THE INVENTION

In conventional injection blow molding apparatus, the blowing of the parison in the blow mold and the cooling of the blown article sufficiently to make it stiff enough for removal from the mold, takes more time than the operations at the injection station and the stripper station. In order to increase the production of such a blow molding apparatus, it is necessary to shorten the time required for the blowing operation.

This invention reduces the time in the blowing step by cooling the blown article faster so that it becomes stiff enough, in a shorter time, for removal from the blowing mold. Cooling liquid circulates through chambers in the blow mold and this cools the blown article which contacts with the surface of the blow mold cavity.

Such cooling of the plastic is entirely from the outside surface of the plastic. Since plastic materials are not particularly good conductors of heat, the cooling can be performed faster if the plastic is cooled from the inside as well as from the outside. This invention cools the plastic of the blown article from the inside by circulating a mist in the space enclosed by the blown article. The mist consists of small globules of liquid carried by a gas. The liquid in the gas stream increases the heat conducting capacity of the cooling fluid because the specific heat of the water globules is higher than that of the gas and thus increases the specific heat of the mist as compared to that of a dry gas.

To the extent that liquid globules contact with the inside surface of the plastic and evaporte, the cooling is greatly increased by the latent heat of vaporization of the liquid being absorbed from the surface of the plastic. In the case of water, only one BTU need be added to a pound of water to raise the temperature of the water 1° F; but 970 BTU must be added to the water to change the water from liquid to vapor at the same temperature. Thus evaporation of water within the space enclosed by the blown article greatly increases the rate at which heat can be extracted from the plastic with resulting decrease in temperature of the plastic.

This invention also requires special construction of a core rod. Ordinary core rods have provision for blowing air from the core rod to expand a parison on the core rod into contact with the sides of a blow mold cavity. The amount of air entering the blown article is equal to the inside volume of the blown article. While some of this air escapes from within the blown article when the pressure decreases, there is no actual circulation of air or other cooling fluid through the article in the blow mold.

The core rod construction of this invention provides for the inlet and exhaust of the mist at the same time so that there is a steady circulation of cooling fluid through the blown article to provide inside cooling. In the preferred construction, a sleeve on the outside of the core rod is movable lengthwise of the core rod to cover up passage outlets from the core rod while the core rod is in an injection mold. This prevents these passages from being clogged by plastic when the parison is applied to the core rod.

The invention also provides an improved method for cooling a blown article from the outside and inside simultaneously.

Other objects, features and advantages of the invention will appear or be pointed out as the description proceeds.

BRIEF DESCRIPTION OF DRAWING

In the drawing, forming a part hereof, in which like reference characters indicate corresponding parts in all the views:

FIG. 1 is a diagrammatic top plan view of a molding machine having an injection station, blowing station, and stripper station located at angularly spaced regions around an indexing head;

FIG. 2 is a top plan view of the lower half of a blowing mold and showing a core rod in the mold and a blown article in contact with the wall of the mold cavity; the controls for the fluid supply to the core rod being shown diagrammatically;

FIG. 3 is a fragmentary view of a portion of the core rod shown in FIG. 2, but with the core rod valve means in closed positions;

FIG. 4 is a greatly enlarged fragmentary sectional view of a portion of the core rod shown in the other figures; and FIG. 5 is a sectional view, on an enlarged scale, taken on the line 5—5 of FIG. 4 but extending across the full width of the core rod; this figure being also on the line 5—5 of FIG. 2.

DESCRIPTION OF PREFERRED EMBODIMENT

FIG. 1 is a diagrammatic view showing the kind of plastic molding machine to which this invention applies. A blow molding machine 10 has an injection mold station 12, a blowing station 14 and a stripper station 16. These three stations are located at equal angular spacing of 120° around a core rod support for indexing table 18. The drawing shows a single core rod 20 extending from each of the three faces of the table 18, but it will be understood that ordinarily more than one core rod extends from each station.

Plastic is injected into a mold at the injection station 12 to coat the core rod with a parison and when the mold at the injection station opens, the table 18 turns 120° to carry the parison with the core rod to the blowing station 14. A mold at the blowing station has a cavity 22 which is shaped to the form of the article to be blown.

Air is applied under pressure through the core rod 20 at the blowing station 14 to expand the parison on the core rod into contact with the walls of the blow mold cavity 22.

It is necessary for the blown article at the blowing station 14 to cool somewhat before it can be removed from the blow mold because it must have sufficient rigidity to avoid deforming when the core rod 20 lifts the blown article from the blow mold after the blow mold opens. Molds at blowing stations are water cooled so as to bring the temperature of the blown article down to a value at which the blown article acquires some stiffness. This invention is particularly concerned with the cooling of the blown article at the blowing station 14 in a shorter time so as to increase the productive capacity of the molding apparatus by decreasing the time required to cool the article at the blowing station.

From the blowing station 14, the blown article, indicated by the reference character 23 in FIG. 1 is stripped from the core rod 20 by a stripper 24 at the stripper station 16. The apparatus thus far described is conventional and no further description of it is necessary for a complete understanding of this invention.

FIG. 2 shows a portion of the table 10 and another part designated by the reference character 10' which is located further to the right than the part shown above it. It will be understood, however, that the part 10' is an integral part of the table 10 and is displaced in FIG. 2 merely because of lack of space for the drawing. The core rod 20 is shown on an enlarged scale and in section. The table end of the core rod fits into a socket 26 in a face of the table 10 and is secured in the socket by a retaining plate 28 attached to the table 12 by detachable fastening means and of conventional construction.

FIG. 2 shows a section 30 of a blowing mold 32. There is another section similar to the section 30 which fits on top of the section 30 to complete the blow mold and these sections move toward and from each other to close and open the mold. The upper section of the blow mold 32 is indicated by the reference character 30'.

The cavity 22 is shown in FIG. 2 with a blown article 23 in contact with the wall of the cavity 22. This blown article 28 has a neck portion 38 which is held in a complementary portion of the blowing mold so that the neck portion 38 is not expanded during the blowing operation. Beyond the complementary neck portion of the blowing mold the cavity 22 opens up to the desired cross section of the body of the container or other blown article which is to be formed in the blowing mold, as shown in FIG. 2.

There is an air passage 40 extending for the full length of the core rod 20; and this air passage 40 communicates with an air passage 42 in the table 10.

A poppet valve 46, at the end of the core rod remote from the table 10, moves toward and from a seat 48 to open and close the end of the passage 40.

A stem 50 of the valve 46 slides in a counterbore 52 in the core rod; and this counterbore 52 provides a bearing for the valve stem 50 but there are slots in the stem 50, as indicated by dotted lines in FIG. 2, for permitting air to flow freely past the sides of the stem 50 so that the passage 40 communicates with the open end of the core rod when the valve 46 is in open position.

A valve stem extension 50a extends to the table end of the core rod 20. There is a spring 54 compressed between a shoulder in the passage 40 and a nut 56, on the end of the core rod, for urging the valve 46 into closed position. An actuator 58 presses against the nut 56 to open the valve 46 in accordance with the programming of the molding machine, this being conventional apparatus.

FIG. 3 shows the core rod 20 with the valve 46 closed against the seat 48. This seat 48 is a tapered end face of a sleeve 60 which forms a part of the core rod 20 but which is slidable for a limited distance along the outside surface of the fixed portion of the core rod 20. When the valve 46 is in closed position, it presses the sleeve 60 against a shoulder 62 of the fixed portion of the core rod. When an article is to be blown in the blowing mold, the valve 46 is opened and air under pressure is supplied through the passage 40 and out through the space between the seat 48 and valve 46 into contact with the inner surface of the parison which coats the core rod. This expands the parison until it comes in contact with the wall of the cavity of the blowing mold in accordance with conventional practice. During the blowing operation, the sleeve 60 remains in the position in which it is shown in FIG. 3.

As soon as the blowing operation is complete, this invention provides means for cooling the blown article more quickly by cooling it from both the inside and the outside simultaneously. This effects a substantial reduction in cooling time because plastic materials are not good conductors of heat; and when the article is cooled from one side only, heat from the other side must travel by conduction through the plastic wall of the blown article. As soon as the compressed air used for blowing is shut off, this invention introduces a supply of mist; that is, a current of air carrying a substantial amount of water vapor and preferably actual globules of water which give the moist air a much higher specific heat so that it is capable of absorbing larger quantities of heat from the plastic without as much rise in temperature as occurs with dry air.

This moist air or mist is circulated through the space enclosed by the blown article and it cools the blown article from the inside while the walls of the mold cavity cool the blown article from the outside.

The cooling air is introduced into the interior of the blown article in a highly saturated condition, and preferably as a mist containing globules of water. As the mist comes into the warm interior of the blown article, the globules of water may evaporate and the relative humidity of the air decrease as the temperature rises; so the term "mist" used in describing the cooling medium of this invention is used in a broad sense to indicate an actual mist containing minute globules of water or a stream of air of very high humidity. In the operation of the invention the first air introduced into the blown article will be heated quickly from the hot plastic of the blown article; but as the article is cooled, the mist will be less highly heated and as the article reaches the desired temperature for removal from the blowing mold, the inside surface of the blown article usually has some water on it; that is, the inside surface is wet. This moisture is removed by shutting off the supply of mist and blowing dry air through the article in the final air circulation cycle. This drying out of the inside of the blown article can be accomplished after the article leaves the cavity of the blowing mold and while it is on its way to the stripper station.

The mist is preferably introduced into the blown article at a low temperature; but the most important factor of the rapid cooling is the latent heat of vaporization of water, or such other fluid as may be used for the cooling. Water evaporating from its liquid phase to its vapor phase absorbs heat from its surroundings at the rate of 970 BTU per pound of water without any increase in temperature. Thus water globules evaporated from the interior of the blown article remove much larger quantities of heat from the plastic than can be absorbed by a stream of air.

The apparatus for circulating for cooling mist through the blown article 36 is shown clearly in FIG. 2. Water at low pressure passes through a temperature controller 64 where its temperature is preferably reduced. The water then passes through a check valve 65 to a water reservoir 66. Air under pressure passes through a temperature controller 68, for cooling the air, and then travels through a supply passage 70 and through a pressure regulator 72 to a solenoid operated valve 74. The air under pressure can also be supplied through a pressure regulator 76 to the reservoir 66 so as to pressurize the air in the reservoir.

Beyond the water reservoir 66, the water passes through a manually operated shut-off valve 78 and a solenoid operated shut-off valve 80 to a mixer valve 82. Air under pressure is supplied from the valve 74 to the mixer valve 82. When both of the valves 74 and 80 are open at the same time, the pressurized air coming through the mixer valve 82 sprays a mist into a passage 84 which leads to a split manifold 86 clamped around the outside of the core rod 20 near the table end of the core rod.

The communication between the passage 84 and the split manifold 86 is established by a fixed probe 88 which projects into an opening 90 at the bottom of the split manifold 86 whenever the table 10 is indexed to locate a core rod 20 over the probe 88. Then as the table moves downward to bring the core rod into contact with the lower section of the blow mold, the probe 88 projects into the opening 90, and there is an O-ring or other sealing means for preventing leakage of the compressed air around the probe 88.

There is a circumferential groove 92 in the outside surface of the core rod 20 which serves as part of the manifold 86. Long drilled passages 94, one of which is shown in FIG. 2, extend from a shoulder of the core rod 20 to a cross drilling 96 at a portion of the core rod which is within the part that is covered by the parison and subsequently by the blown article 36.

The cross drillings 96 extend through a portion of the core rod 20 which is covered by the sleeve 60. There is a circumferential groove 98 in the inside wall of the sleeve 60 and this groove 48 is wide enough, in the direction of the axis of the core rod, to communicate with the cross drillings 96 whether the sleeve 60 is in contact with the shoulder 62, as shown in FIG. 3, or spaced from the shoulder 62, as shown in FIG. 4.

Mist discharge outlets 100 are located at angularly spaced regions around the end face of the sleeve 60. These discharge passages 100 lead from the groove 98 through the end wall of the sleeve 60 which confronts the shoulder 62 of the core rod 20.

When the mist supply is first turned on, the sleeve 60 is in the position shown in FIG. 3 in contact with the shoulder 62. However, pressure of the mist against the shoulder 62 pushes the sleeve 60 toward the left in the drawing so that a stream of mist, indicated by the arrows 102, in FIG. 4, can be discharged into the space within the blown article 36, as shown by the arrows 102 in FIG. 2. The mist flows through the space enclosed by the blown article 23 at considerable velocity and exhausts through the clearance between the valve 46 and the seat 48. The exhaust mist passes through the core rod passage 40 and into the passage 42 of the table 10. A probe 106 puts the passage 42 in communication with a passage 108 when the table 10 is in its lowered position which locates the core rods in the molds.

A solenoid operated exhaust valve 110 provides a quick exhaust for the mist. When this exhaust valve 110 is moved into a different position it communicates with an air supply passage 112 commanded by a valve 114 for supplying the compressed air for blowing the parison. The supply passage for compressed air used for blowing is indicated in FIG. 2 by the reference character 116. The operation of all of the valves of the system is under the control of the programming controls of the molding machine, part of which includes a timer 118 for operating the valves 74 and 80.

The mist continues to circulate through the interior of the blown article, as indicated by the arrows 102, until there has been sufficient time for the blown article to become stiff enough to be taken from the blow mold cavity. The timer 118 then shuts the valve 80 so that no more water can be supplied to the mixer valve 82 and air continues to flow through the interior of the blown article to evaporate what moisture remains in the blown article. If desired this air which follows the mist can be heated to facilitate the evaporation of moisture from the interior of the blown article.

Time can be saved in the cycle of the molding machine by blowing the final drying air through the blown article while the article is being transported from the blowing mold to the stripper station.

When the pressure of air from the mist discharge passages 100 thrusts the sleeve 60 away from the shoulder 62, it is necessary to limit the movement of the sleeve 60 so as not to close the exhaust passage between the valve 46 and seat 48 (FIG. 2). This motion is limited by having a pin 122 which extends as a fixed stud from the top of the core rod 20. This pin or stud 122 projects into a channel 124 in the inside surface of the sleeve 60 and the right hand end 126 of the channel 124 contacts with the stud 122 to limit the movement of the sleeve to the position shown in FIG. 2 which leaves clearance at both ends of the sleeve between the shoulder 62 and valve 46 so that the mist can circulate freely into and out of the space enclosed by the blown article.

The upper and lower sections of the blow mold 32 are cooled by liquid, usually water, to keep the walls of of the cavity 22 at a temperature low enough to chill the plastic to a temperature at which the blown article is stiff enough to be removed from the blowing mold. Cooling chambers in the sections of the mold 32 are indicated by circles marked by the reference character 130. Such mold cooling is conventional and no connections for supplying the liquid to the mold is necessary for a complete understanding of this invention.

The preferred embodiment of the invention has been illustrated and described, but changes and modifications can be made, and some features can be used in different combinations without departing from the invention as defined in the claims.

What is claimed is:

1. Blow molding apparatus for making plastic articles by blowing a parison on a core rod including in combination a blow mold having a cavity, a core rod that is coated with a parison and that extends into the cavity, a support for the core rod and with which the core rod has relative movement with respect to the blow mold to carry the plastic on the core rod to the blow mold, means for blowing the plastic to form a blown article comprising a blow air inlet passage in the core rod, means for circulating a mist of liquid globules carried by a gas stream through the core rod and into contact with the inside surface of the plastic that is blown in the blow mold cavity, and a source from which said mist is supplied, characterized by the means for circulating the mist including inlet and exhaust passages through the core rod having openings from the core rod into the space enclosed by the article blown in the blow mold, the respective openings of the inlet and exhaust passages being located near opposite ends of the cavity to cause circulation of the mist in the space enclosed by an article blown on the core rod, said mist exhaust passage further comprising the blow air inlet passage for blow molding.

2. The blow molding apparatus described in claim 1 characterized by valve means closing said openings to prevent plastic of the parison from entering the openings when the parison is originally applied to the core rod, and means for moving said valve means into open position when mist is to be circulated in the cavity.

3. The blow molding apparatus described in claim 2 characterized by the valve means including a sleeve that slides lengthwise on the core rod and that provides at least a part of the length of the core rod that is coated by the parison, an actuator for the sleeve, and motion-transmitting means connecting the actuator with the sleeve.

4. The blow molding apparatus described in claim 1 characterized by means for preventing flow of mist when a core rod is first introduced into the blow mold, means for supplying gas under pressure to expand a parison on the core rod to produce a blown article of predetermined size, and controls that circulate the mist in the cavity in contact with the inside surface of the blown article.

5. The blow molding apparatus described in claim 4 characterized by control means that shut off the circulation of mist after a predetermined time, and that continues circulating dry air to flush out any remaining mist and condensation from the blown article in the mold cavity.

6. The blow molding apparatus described in claim 4 characterized by the source for supplying the mist including an air supply line and a water supply line, a different valve in each line, a mixer where the water and air are brought together to make the mist, and means for circulating the mist including a passage leading from the mixer through the core rod and out through a side of the core rod in the cavity, and also including another passage through the core rod to an exhaust outlet for the mist, the control means that shut off the circulation of mist being the valve in the water supply line.

7. The blow molding apparatus described in claim 1 characterized by adjustable temperature control means for the mist supply.

8. The blow molding apparatus described in claim 1 characterized by adjustable pressure control means for the mist.

9. The blow molding apparatus of claim 1, wherein said mist exhaust passage is axially spaced more remote from the core rod support than the mist inlet passage so that the mist circulates away from the support and is removed axially from the remote end of the core rod.

10. The blow molding apparatus of claim 1, said mist inlet passage being formed to initially direct the mist toward said core rod support.

11. Blow molding apparatus for making plastic articles by blowing a parison on a core rod including in combination a blow mold having a cavity, a core rod that is coated with a parison and that extends into the cavity, a support for the core rod and with which the core rod has relative movement with respect to the blow mold to carry the plastic on the core rod to the blow mold, means for circulating a mist of liquid globules carried by a gas stream through the core rod and into contact with the inside surface of the plastic that is blown in the blow mold cavity, and a source from which said mist is supplied, characterized by the means for circulating the mist including inlet and exhaust passages through the core rod, each of said passages having an opening into the space enclosed by an article blown on the core rod and at a location spaced from the other opening, valve means closing said openings to prevent plastic of the parison from entering the openings when the parison is originally applied to the core rod, and means for moving said valve means into open position when mist is to be circulated in the cavity, characterized by the valve means including a sleeve that slides lengthwise on the core rod and that provides at least a part of the length of the core rod that is coated by the parison, an actuator for the sleeve, and motion-transmitting means connecting the actuator with the sleeve, characterized by the sleeve extending to the end portion of the core rod remote from the support, a valve element at said end of the core rod and in position to confront an end face of the sleeve, the opening for the mist exhaust passage being the clearance between the valve element and the confronting end face of the sleeve, said end face serving as a seat for the valve element when said exhaust passage is closed, the valve element constituting part of the motion-transmitting means between the actuator and the sleeve, the end of the sleeve that is nearer to the support for the core rod having a face that confronts a shoulder on the core rod, and the opening of the mist supply passage being shut off by contact of the end face of the sleeve with said shoulder of the core rod, the opening from the mist supply passage being oriented in a direction to thrust the sleeve toward the end of the core rod remote from the support when the valve is in open position and the sleeve is free to slide on the core rod toward said valve element.

12. The blow molding apparatus described in claim 11 characterized by an abutment that contacts with the sleeve to limit the sliding movement of the sleeve on the core rod to a distance which prevents the sleeve from moving into contact with the valve element when the valve element is in fully open position.

13. The blow molding apparatus described in claim 11 characterized by the valve means for the mist supply passage including a shut-off valve in the passage upstream from the core rod portion of the passage that discharges into the cavity, means for supplying other fluid through the core rod for blowing the parison in the blow mold cavity, and controls for preventing the supply of mist and said other fluid to the core rod at the same time.

14. The blow molding apparatus described in claim 13 characterized by the means for supplying said other fluid for blowing the parison being connected with the core rod passage through which mist exhausts from the blow mold cavity, and valve means for preventing said other fluid from exhausting from the mist supply exhaust passage during blowing of a parison.

* * * * *